(12) United States Patent
Sahm et al.

(10) Patent No.: US 9,243,712 B2
(45) Date of Patent: Jan. 26, 2016

(54) SEAL FOR A VESSEL FILLED WITH FLUID (75) Inventors: Dietmar Sahm, Reichshof (DE);
Eberhard Biermann, Ravensburg (DE);
Josef Haupt, Tettnang (DE)

(73) Assignee: IBS FILTRAN KUNSTSOFF-/METALLERZUEGNISSE GMBH, Morsbach (DE)

( * ) Notice: Subject to any disclaimer, the term of this patent is extended or adjusted under 35 U.S.C. 154(b) by 1122 days.

(21) Appl. No.: 12/468,737

(22) Filed: May 19, 2009

(65) Prior Publication Data

US 2010/0126304 A1    May 27, 2010

(30) Foreign Application Priority Data

May 20, 2008   (DE) .......................... 10 2008 024 265

(51) Int. Cl.
*F16J 15/10*   (2006.01)
*F02F 11/00*   (2006.01)
*F02F 7/00*    (2006.01)

(52) U.S. Cl.
CPC .............. *F16J 15/106* (2013.01); *F02F 11/00* (2013.01); *F02F 7/006* (2013.01); *Y10T 74/2186* (2015.01)

(58) Field of Classification Search
CPC ........ F16J 15/104; F16J 15/106; F02F 11/00; F02F 7/006; Y10T 74/2186
USPC ........... 74/606 R, 606 A, 607; 277/594, 639, 277/642, 644, 598, 592; 123/90.38
See application file for complete search history.

(56) References Cited

U.S. PATENT DOCUMENTS

| 1,463,360 | A | * | 7/1923 | Foote | 277/641 |
| 1,629,346 | A | * | 5/1927 | Larson | 215/233 |
| 1,777,443 | A | * | 10/1930 | Mastin | 277/648 |
| 1,969,640 | A | * | 8/1934 | Curtin | 4/378 |
| 3,334,774 | A | * | 8/1967 | Poltorak | 220/378 |
| 5,957,100 | A | | 9/1999 | Frohwerk et al. | |
| 6,543,787 | B1 | * | 4/2003 | Inciong | 277/593 |
| 7,063,327 | B2 | * | 6/2006 | Salameh | 277/590 |
| 2003/0037756 | A1 | | 2/2003 | Salameh | |
| 2007/0012271 | A1 | | 1/2007 | Hilpert | |
| 2009/0217900 | A1 | | 9/2009 | Salameh | |

FOREIGN PATENT DOCUMENTS

| CA | 659068 | A | 3/1963 |
| CN | 1133249 | A | 10/1996 |
| DE | 1264144 | A | 3/1968 |
| DE | 3815511 | A1 | 11/1989 |
| DE | 3815511 | C2 | 5/1990 |

(Continued)

OTHER PUBLICATIONS

German Office Action issued on Aug. 1, 2013 in counterpart German Applicaton No. 102008024265.9 (8 pages, in German).

(Continued)

*Primary Examiner* — Thomas Diaz
(74) *Attorney, Agent, or Firm* — Grossman, Tucker, Perreault & Pfleger, PLLC (57) ABSTRACT

A seal for a fluid-fillable vessel of a gearing or motor is provided. The seal includes a first sealing body with a first inside sealing lip, with a first leg protruding from the sealing body, at the distal end of which there is arranged a second outer sealing lip which protrudes from the first leg. Reliable sealing can thus be achieved and apparent leakiness of a fluid vessel can be prevented at the same time.

20 Claims, 7 Drawing Sheets

(56) References Cited

FOREIGN PATENT DOCUMENTS

| | | |
|---|---|---|
| DE | 202005010449 U1 | 12/2006 |
| EP | 0860602 A1 | 8/1998 |
| EP | 1288476 A2 | 3/2003 |
| FR | 2732741 A1 | 10/1996 |
| JP | 1320374 A | 12/1989 |
| JP | 08277937 A | 10/1996 |
| JP | 2002372152 A | 12/2002 |
| JP | 200635872 A | 2/2006 |
| JP | 2006-242203 A | 9/2006 |
| WO | 03008290 A1 | 1/2003 |
| WO | 2007093265 A1 | 8/2007 |

OTHER PUBLICATIONS

European Office Action issued on Jan. 31, 2013 in counterpart European Application No. 09005768.8 (4 pages, in German).

* cited by examiner

SEAL FOR A VESSEL FILLED WITH FLUID

CROSS-REFERENCE TO RELATED APPLICATIONS

This application claims priority to German Patent Application No. 102008024265.9, filed on May 20, 2008, and entitled "A Seal For A Vessel Filled With Fluid," the disclosure of which is incorporated herein by reference in its entirety.

FIELD OF THE INVENTION

The present invention relates to a seal for a fluid-fillable vessel of a motor or a gearing and a fluid vessel with such a seal.

BACKGROUND OF THE INVENTION

When mounting a vessel that can be filled with a fluid or a cover such as a cylinder head cover or an oilpan made of metal or plastic, elastomeric seals are preferably used for sealing the individual components. The function of such a seal is not only separating the fluid from certain areas. In addition, such a seal should also bridge a gap which occurs between the components to be connected. Such a gap can be formed by inevitable production tolerances during the mounting process or by deformation as a result of thermal, mechanical or other influences during the use of a vessel, a cover or a trough.

When using fluid vessels it is inevitable that a sealing gap will occur between the components of such a fluid vessel to be connected, which gap reaches from the edge of the vessel to the seal and has a height of more than 0.1 mm. This leads to the consequence that as a result of the capillary effect in the sealing gap a medium can penetrate the vessel from the outside. When such a sealing gap is inspected visually, the impression is given that the seal is perfect although the seal per se offers reliable sealing between the inside and outside space. Such an apparent tightness can hardly be distinguished from actual leakiness.

An additional problem can arise when a vessel filled with fluid is to be filled subsequently from the outside via a filling device or opening with the respective fluid. Depending on the position or the constructional configuration of this filling device or the opening it is inevitable that a residual quantity of the supplied fluid will reach the sealing gap during or after a filling process. Although the used seal will reliably seal the area from the inside of the vessel to the outside of the vessel, the impression might be given again due to the fluid present in the sealing gap that there is a leakage. Such an apparent leakiness leads to the consequence that efforts are made to remove the residual quantities of fluid from the sealing gap. This mostly occurs by complex and costly cleaning processes where it is acted upon the sealing gap from the outside. One example for such a cleaning process is cleaning by means of a high-pressure jet.

The problem of apparent leakiness can further occur when a vessel which is already filled with fluid and comprises components which are rigidly connected and sealed with each other is dismounted as a result of a maintenance measure. During such a dismounting process, residual quantities of the fluid reach a sealing groove and the adjacent outer flange area of the vessel. It is common practice that after the completed maintenance all components to be mounted again will be manually cleaned from residual quantities of the fluid. During the subsequent mounting of the components, these components are pressed tightly together with the seal, so that residual quantities of fluid are pressed out of the sealing groove. Despite a reliable sealing, the problem of apparent leakiness occurs again, so that laborious and mostly superfluous cleaning processes are performed.

SUMMARY OF THE INVENTION

Embodiments of the present invention provide a seal with which a reliable sealing of parts of a fluid vessel to be joined is achieved, with the apparent leakiness as described above no longer occurring during operation, after filling or after mounting of the fluid vessel. Other embodiments of the present invention provide a fluid vessel with such a seal.

In accordance with an embodiment of the present invention, a seal for a fluid-fillable vessel or a gearing or motor comprises a first sealing body for reliable sealing between the fluid vessel parts to be joined with a first inside sealing lip, with a first leg protruding outwardly from the sealing body, which leg can extend in the region of a sealing gap between the fluid vessel parts, at the distal end of which there is formed a second outer sealing lip which protrudes from the first leg and which enables sealing of the outer edge of the vessel parts, so that no fluid can penetrate the sealing gap from the outside, and medium disposed between the inside sealing lip and the outside sealing lip can move to the outside.

A reliable sealing between the fluid vessel parts to be connected is achieved by the first sealing body. A first leg protruding from the first sealing body can be arranged in such a way that it extends in the region of a sealing gap between the fluid vessel parts. The second outer sealing lip at the distal or outer end of the leg enables sealing of the outer edge of the vessel parts, so that no fluid can penetrate into a sealing gap from the outside. If fluid needs to be refilled into the vessel and residual quantities remain in a sealing gap, they no longer reach the outside as a result of the second outer sealing lip, so that the impression of apparent leakiness can no longer arise. Although residual quantities can be pressed into a sealing gap during the mounting of fluid vessel parts, they will no longer move to the outside because the second outer sealing lip will prevent any leaking of the fluid. As a result of the first leg protruding from the sealing body in combination with a second outer sealing lip protruding from the same, any apparent leakiness is reliably prevented.

Preferably, the first inside sealing lip and the second outer sealing lip are oriented in the same direction. In such an embodiment, a region is formed between the sealing lips which can hold residual quantities of fluid as in an intermediate storage. Any fluid stored there will thus neither enter the interior of the vessel nor will leave the vessel. No apparent leakiness can be assumed from the outside.

The first sealing body can also be arranged as a leg, so that the seal substantially has the shape of an L. The leg of the sealing body can be inserted well into a sealing groove, so that easier mounting of the seal in a part of the vessel is enabled. The leg of the sealing body and the first leg protruding from the same further enable a relatively large area in which fluid can collect as in an intermediate storage. The second outer sealing lip reliably prevents that fluid collected in an intermediate storage can reach the outside.

According to a further embodiment of the invention, a second sealing body protrudes from the first leg which connects the first sealing body and the second outer sealing lip with each other. Fluid which has collected between the first inside sealing lip and the second outer sealing lip as an intermediate storage can be prevented to flow along the circumference of the vessel. When several such second sealing bodies are provided, chambers can be formed which are delimited by a first sealing body, a second sealing body and a second sealing lip.

DETAILED DESCRIPTION

Figure 1:
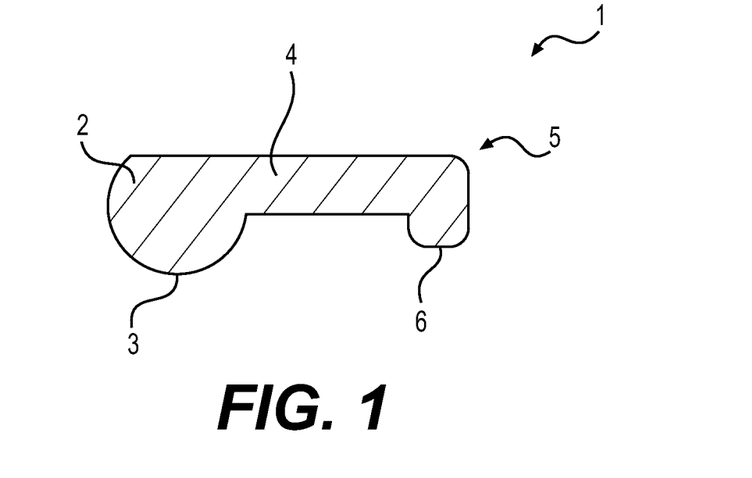
FIG. 1 shows a cross-sectional view of a seal, in accordance with a first embodiment of the present invention.
Figure 2:
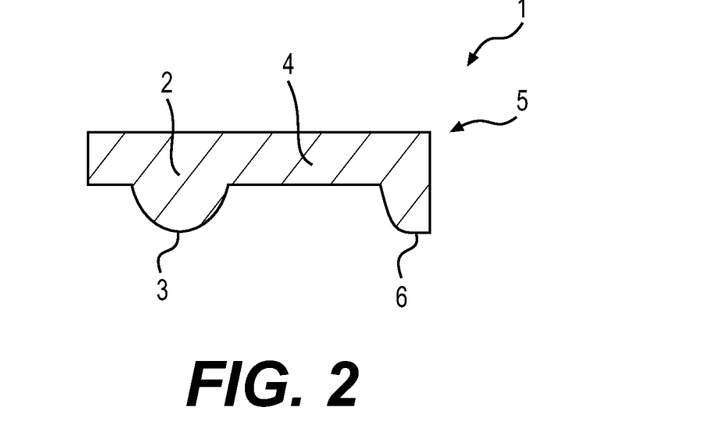
FIG. 2 shows a cross-sectional view of a seal, in accordance with a second embodiment of the present invention.
Figure 3:
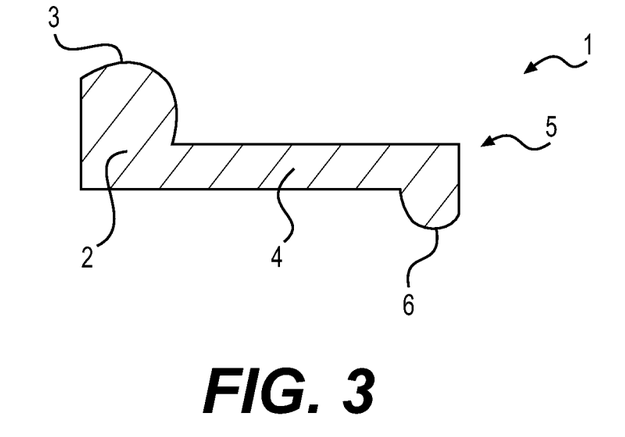
FIG. 3 shows a cross-sectional view of a seal, in accordance with a third embodiment of the present invention.

FIG. 1 shows a first embodiment of a seal 1 in accordance with the invention, comprising a first sealing body 2 and an associated sealing lip 3. A first leg 4 protrudes from the sealing body 2, with a second sealing lip 6 being provided at the distal end 5 of the first leg 4. As is shown in FIG. 1, the sealing body 2 can have a round shape, or, as in the embodiment as shown in FIG. 2, a cornered shape as an extension of the first leg. It is further also possible that the first inside sealing lip 3 is arranged in a direction opposite of the second outer sealing lip 6, as shown in FIG. 3. In this case, a groove for the first sealing lip 3 can be provided in an upper part of the vessel and an additional groove for the second sealing lip 6 in a bottom part of the vessel.

Figure 10:
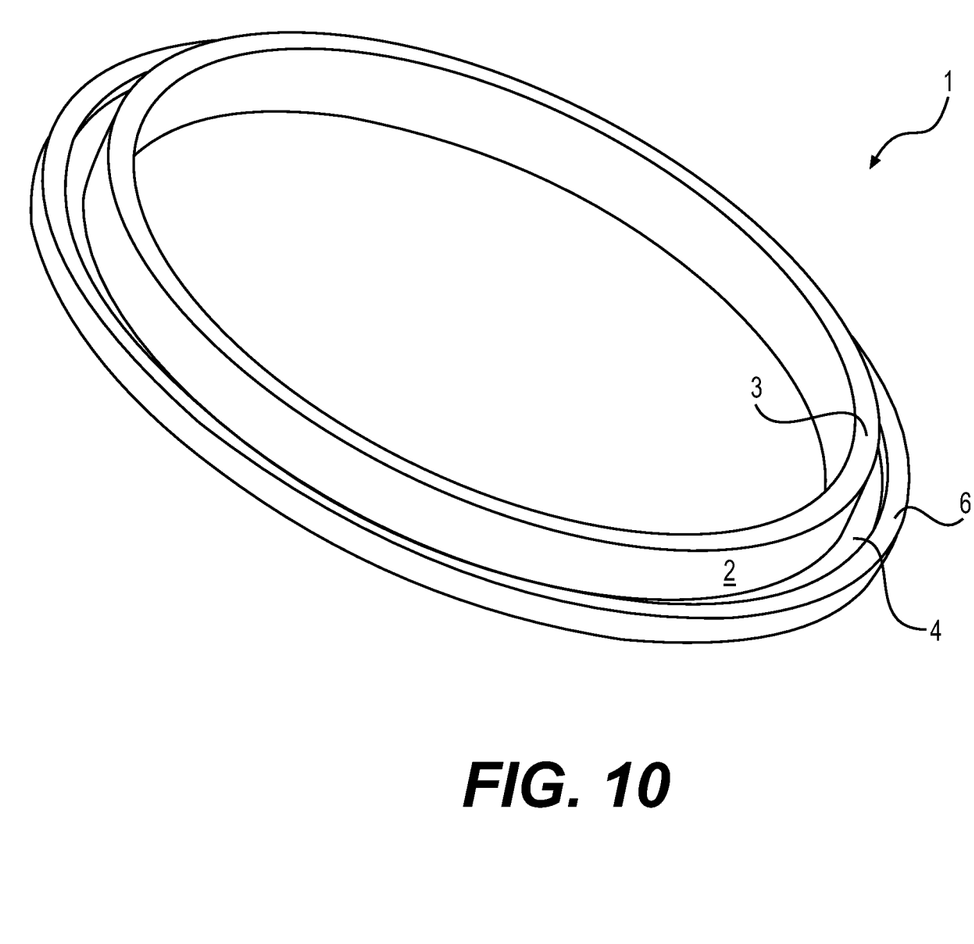
FIG. 10 shows a perspective view of a seal, in accordance with a further embodiment of the present invention.

Principally, the seal in accordance with the invention can have any shape along the progression of its circumference, which shape is preferably adjusted to the shape of the fluid vessel to be sealed. FIG. 10 shows an embodiment of the seal in accordance with the invention for a fluid vessel whose cross section is circular at least in the region to be sealed.

Figure 4:
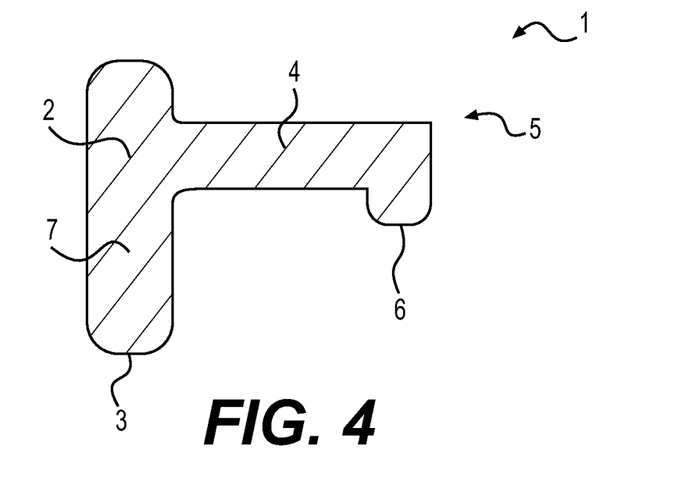
FIG. 4 shows a cross-sectional view of a seal, in accordance with a fourth embodiment of the present invention.
Figure 5:
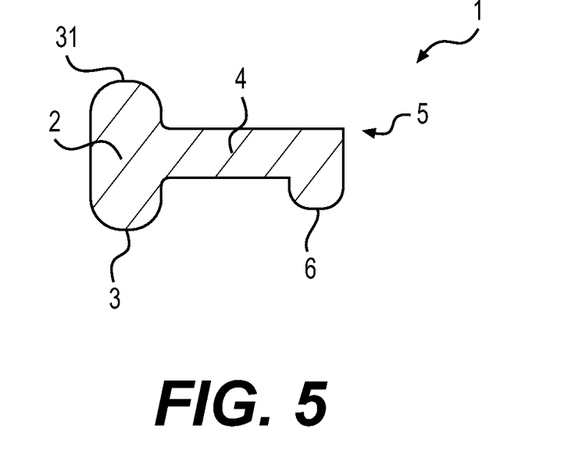
FIG. 5 shows a cross-sectional view of a seal, in accordance with a fifth embodiment of the present invention.

As is shown in FIG. 4, the first sealing body 2 can also be arranged as a leg 7. This is advantageous because the leg 7 can be inserted easily into a groove and there is only a small likelihood that the seal 1 will slip during mounting. This also applies to the embodiment as shown in FIG. 5, with the first sealing body not only comprising a first inside sealing lip 3, but also an additional sealing lip 31 which are opposite of each other.

Figure 6:
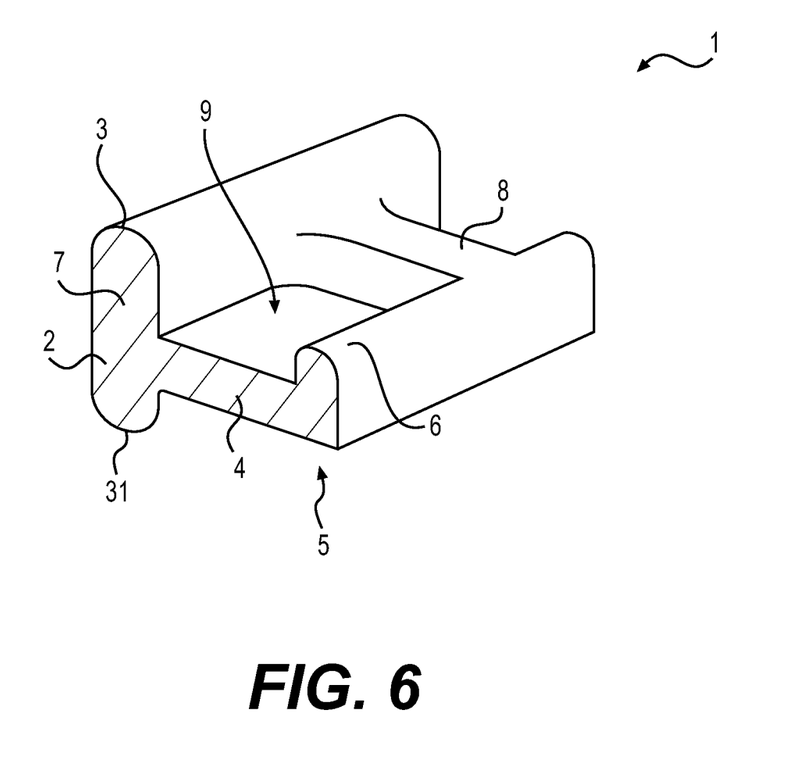
FIG. 6 shows a perspective sectional view of the fourth embodiment of the seal.

In the case of circumferential sealing lips 3 and 6, a region 9 is formed between these sealing lips in which fluid that is possibly present can be collected or stored, as shown in FIG. 6 which shows a perspective view in a twisted representation of the fourth embodiment of the invention as shown in FIG. 4. In order to prevent that the fluid present in the region 9 can move laterally in an unhindered way, a boundary can be created with a second sealing body 8. In the case of two second sealing bodies 8 which are arranged at a distance from each other, a chamber is formed which delimits any present fluid in region 9 to a relatively small zone.

Figure 8:
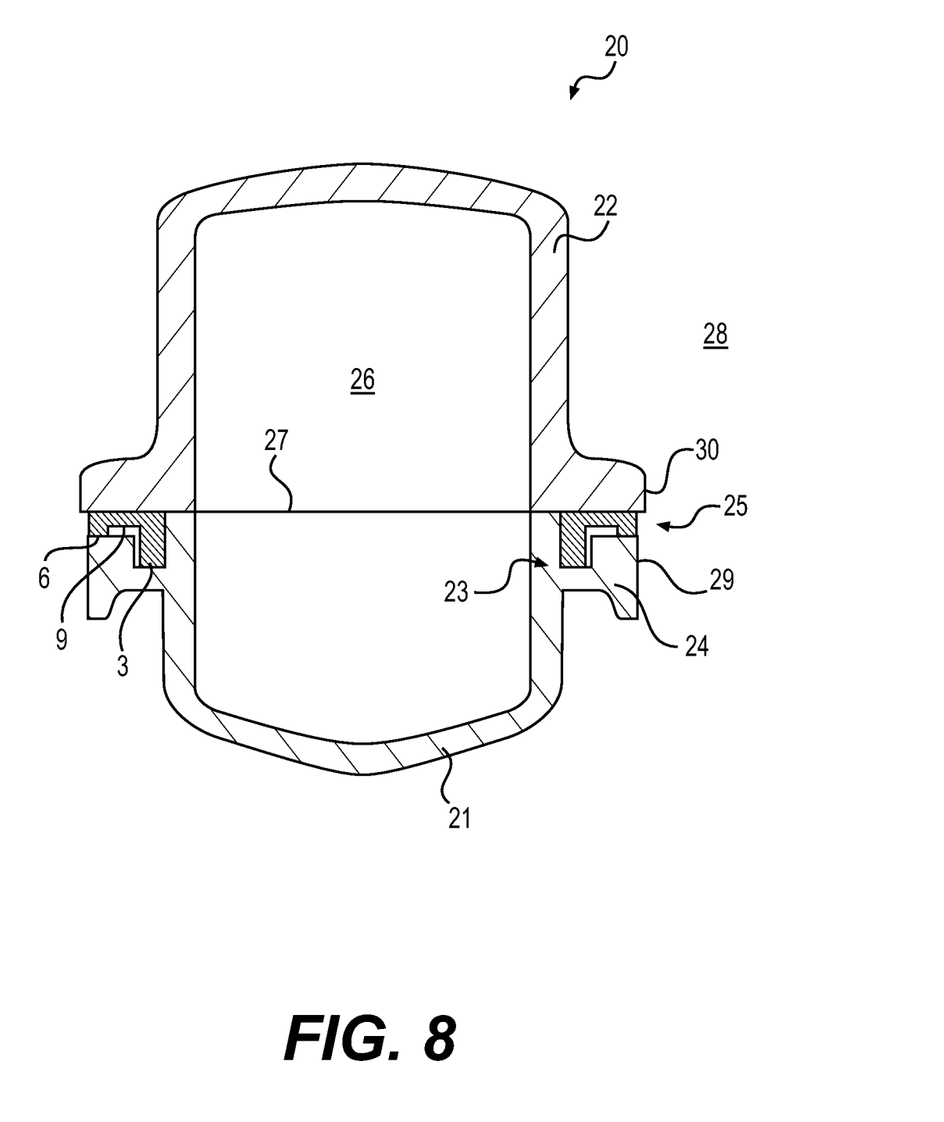
FIG. 8 shows a sectional side view of a first embodiment of the fluid vessel.

The function of the seal in accordance with the invention in a fluid vessel is shown in greater clarity in FIG. 8. It shows a vessel 20 with bottom part 21 and upper part 22 of the vessel as well as a seal in accordance with the invention in the state when mounted between the two vessel parts 21, 22. In order to prevent apparent leakiness, it is relevant in the seal in accordance with the invention that a second outer sealing lip 6 is provided at the end of the first leg 4 which prevents fluid from reaching the first inside sealing lip 3 from outside of a vessel (see reference numeral 28). This applies conversely in the same manner in that fluid is prevented by means of the second outer sealing lip 6 from reaching a region 28 outside of the vessel from the inside 26 of the vessel or the chamber 9.

When the first inside sealing lip 3 is inserted in a groove 23 of a fluid vessel 20 in accordance with FIG. 8 and is arranged adjacent to the inside side wall of the bottom part 21 of the vessel, the second outer sealing lip 6 can be arranged at the edge 29 of a flange 24 of the bottom part 21 of the vessel. No fluid can enter the interior 26 of the vessel from the outside region 28 as a result of the second outer sealing lip 6. Any fluid supplied from the outside will collect at an outer edge 30 in the embodiment of the fluid vessel 20 as shown in FIG. 8 and especially there at an edge 25. It is able to drip off there, so that it is no longer located in the region of the sealing gap. Since the elastically arranged first leg 4 of the seal will protrude from the first sealing body 2 and the first leg 4 will provide sealing in the region of the separating plane 27 between the bottom part 21 and the upper part 22 of the vessel in the mounted state, no sealing gap will be formed in this region of the separating plane 27.

When the upper part 22 and the seal 1 are mounted after maintenance, such that the parts are compressed, fluid residues in the groove 23 can collect in a chamber 9. The second outer sealing lip 6 will prevent that this fluid will reach the outer region 28, so that the impression of apparent leakiness is prevented.

Figure 7:
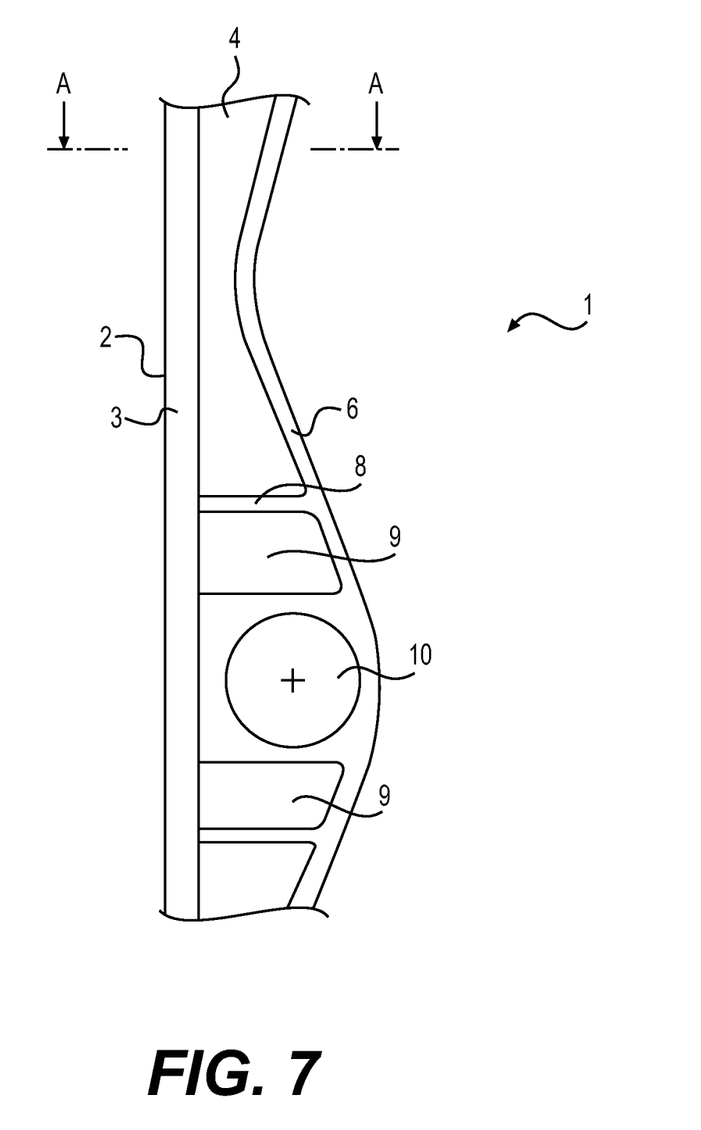
FIG. 7 shows a top view of a part of the fourth embodiment of the seal.
Figure 9:
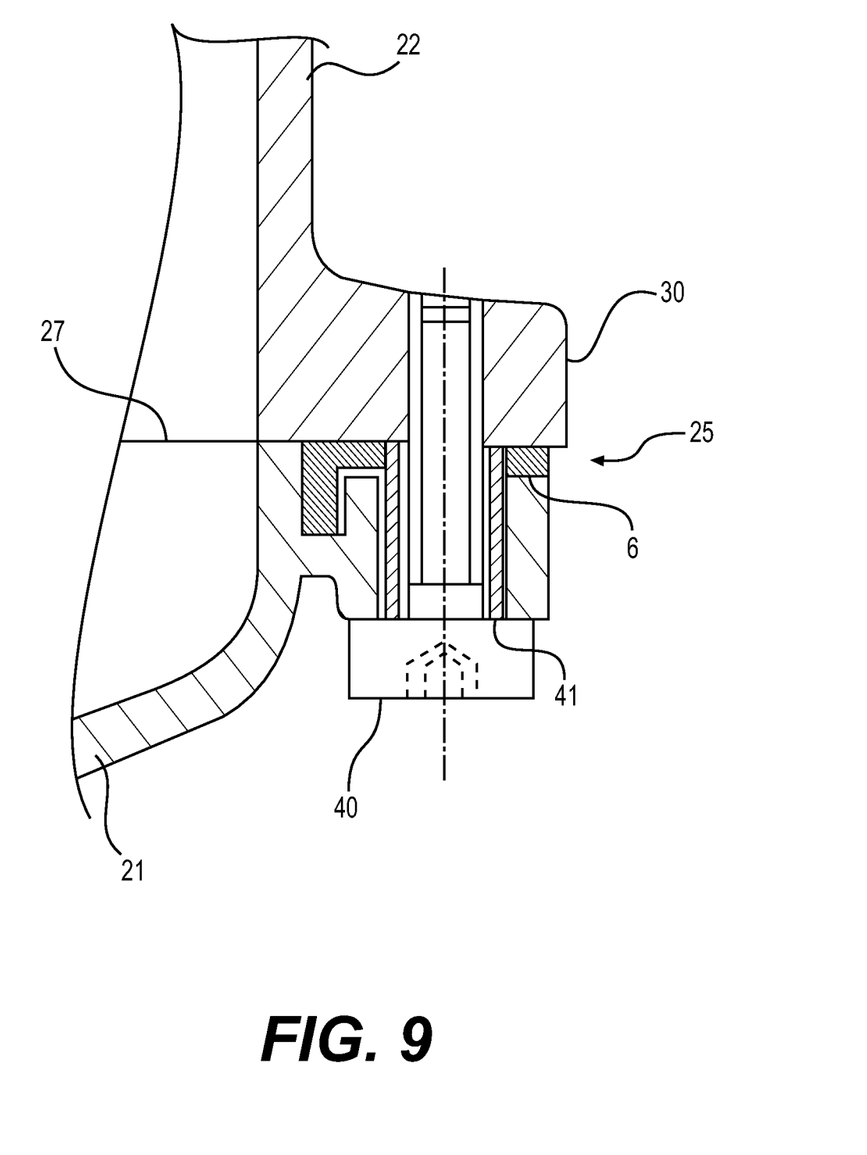
FIG. 9 shows a sectional side view of a second embodiment of the fluid vessel.

FIG. 7 shows a top view of a seal 1 according to FIG. 4, with the seal 1 comprising several chambers 9. In addition, a bore 10 is provided between the first inside sealing lip 3 and the outer second sealing lip 6, through which a mounting screw 40 with a sleeve 41 can be pushed for example (see FIG. 9).

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention

What is claimed is:

1. A seal comprising a bottom part of a vessel, the bottom part configured to form the seal with a top part of the vessel, the seal comprising:
   a groove of the bottom part of the vessel; and
   a sealing lip configured to be inserted into the groove of the bottom part,
   wherein the sealing lip comprises an inside sealing lip having an end region contacting the groove when the sealing lip is inserted into the groove,
   wherein the sealing lip further comprises an outside sealing lip having an end region contacting a flange of the bottom part of the vessel when the sealing lip is inserted into the groove, wherein a chamber is formed between the sealing lip and the bottom part of the vessel when the end region of the inside sealing lip contacts the groove and the end region of the outside sealing lip contacts the flange, and wherein the chamber is configured to collect fluid in the groove to prevent the fluid collected in the chamber from reaching an outer region of the vessel.

2. The seal of claim 1, wherein a portion of the inside sealing lip forms a perpendicular angle with a portion of the outside sealing lip.

3. The seal of claim 1, wherein the outside sealing lip is located at an edge of the flange of the bottom part of the vessel.

4. The seal of claim 3, wherein a location of the outside sealing lip is farther from a center of the vessel relative to a location of the inside sealing lip from the center of the vessel.

5. The seal of claim 4, wherein the sealing lip comprises an elastic material.

6. The seal of claim 4, wherein the prevention of the fluid from reaching the outer region of the vessel reduces an impression of a leak from the outer region of the vessel.

7. The seal of claim 4, wherein an outer edge of the top part of the vessel extends beyond an edge of the bottom part of the vessel.

8. The seal of claim 4, wherein the inside sealing lip is configured to prevent fluid collected in the groove from escaping from the groove.

9. The seal of claim 8, wherein the outside sealing lip is configured to prevent fluid collected in the groove from escaping from the groove.

10. The seal of claim 9, wherein the outside sealing lip is further configured to prevent fluid from the outer region of the vessel from entering an inner region of the vessel.

11. A bottom part of a vessel, the bottom part configured to form a seal with a top part of the vessel, the bottom part comprising:

a groove configured for insertion of a sealing lip, wherein the sealing lip comprises an inside sealing lip having an end region contacting the groove when the sealing lip is inserted into the groove, wherein the sealing lip further comprises an outside sealing lip having an end region contacting a flange of the bottom part of the vessel when the sealing lip is inserted into the groove, wherein a chamber is formed between the sealing lip and the bottom part of the vessel when the end region of the inside sealing lip contacts the groove and the end region of the outside sealing lip contacts the flange, and wherein the chamber is configured to collect fluid in the groove to prevent the fluid collected in the chamber from reaching an outer region of the vessel.

12. The bottom part of the vessel of claim 11, wherein a portion of the inside sealing lip forms a perpendicular angle with a portion of the outside sealing lip.

13. The bottom part of the vessel of claim 11, wherein the outside sealing lip is located at an edge of the flange of the bottom part of the vessel.

14. The bottom part of the vessel of claim 13, wherein a location of the outside sealing lip is farther from a center of the vessel relative to a location of the inside sealing lip from the center of the vessel.

15. The bottom part of the vessel of claim 14 wherein the sealing lip comprises an elastic material.

16. The bottom part of the vessel of claim 14, wherein the prevention of the fluid from reaching the outer region of the vessel reduces an impression of a leak from the outer region of the vessel.

17. The bottom part of the vessel of claim 14, wherein an outer edge of the top part of the vessel extends beyond an edge of the bottom part of the vessel.

18. The bottom part of the vessel of claim 14, wherein the inside sealing lip is configured to prevent fluid collected in the groove from escaping from the groove.

19. The bottom part of the vessel of claim 18, wherein the outside sealing lip is configured to prevent fluid collected in the groove from escaping from the groove.

20. The bottom part of the vessel of claim 19, wherein the outside sealing lip is further configured to prevent fluid from the outer region of the vessel from entering an inner region of the vessel.

* * * * *